United States Patent
Rodek et al.

(10) Patent No.: US 8,869,561 B2
(45) Date of Patent: *Oct. 28, 2014

(54) METHOD AND A DEVICE FOR THE REFINING OF GLASS

(75) Inventors: Erich Rodek, Mainz (DE); Wolfgang Schmid-Bauer, Mainz (DE); Hilgegard Römer, Karben (DE); Günter Weidmann, Flonheim (DE); Werner Kiefer, Mainz (DE)

(73) Assignee: Schott AG, Mainz (DE)

( * ) Notice: Subject to any disclaimer, the term of this patent is extended or adjusted under 35 U.S.C. 154(b) by 280 days.

This patent is subject to a terminal disclaimer.

(21) Appl. No.: 12/658,683

(22) Filed: Feb. 12, 2010

(65) Prior Publication Data

US 2010/0147031 A1     Jun. 17, 2010

Related U.S. Application Data

(63) Continuation of application No. 10/362,396, filed as application No. PCT/EP01/08148 on Jul. 14, 2001.

(30) Foreign Application Priority Data

Aug. 25, 2000   (DE) .................................. 100 41 757

(51) Int. Cl.
  *C03B 5/185*   (2006.01)
  *C03B 5/225*   (2006.01)
  *C03B 5/20*    (2006.01)
  *C03B 5/02*    (2006.01)

(52) U.S. Cl.
  CPC .............. *C03B 5/021* (2013.01); *C03B 2211/71* (2013.01); *C03B 5/225* (2013.01); *C03B 5/205* (2013.01)

USPC ........................................ 65/135.1; 65/135.6

(58) Field of Classification Search
  USPC ................... 65/134.1, 134.9, 135.6
  See application file for complete search history.

(56) References Cited

U.S. PATENT DOCUMENTS

| 2,691,689 | A |   | 10/1954 | Arbeit et al. ................ 65/135.8 |
| 2,808,446 | A | * | 10/1957 | Lambert ...................... 65/135.8 |
| 2,990,438 | A | * | 6/1961  | Lambert et al. .............. 65/135.8 |
| 3,208,841 | A | * | 9/1965  | Burch ............................ 65/179 |

(Continued)

FOREIGN PATENT DOCUMENTS

| DE | 2033074 | 1/1971 | ............... C03B 5/02 |
| DE | 296798  | 12/1991 | |

(Continued)

OTHER PUBLICATIONS

Communication from corresponding Japanese Application No. 2002-521152 dated Jul. 23, 2010.

*Primary Examiner* — John Hoffmann
(74) *Attorney, Agent, or Firm* — Ohlandt, Greeley, Ruggiero & Perle, LLP

(57) ABSTRACT

A device for the refining of a glass melt at high temperatures according to the skull pot principle is provided. The device includes a skull crucible having walls that are constructed from a plurality of pipes, a high-frequency coil for coupling electrical energy into the contents of the skull crucible, and an inlet and an outlet of the skull crucible being arranged in a melt surface region of the glass melt, wherein the inlet and the outlet are essentially arranged lying opposite one another.

3 Claims, 3 Drawing Sheets

(56) References Cited

U.S. PATENT DOCUMENTS

| | | | | |
|---|---|---|---|---|
| 3,218,144 A | * | 11/1965 | Touvay | 65/347 |
| 3,244,495 A | | 4/1966 | Apple et al. | 65/161 |
| 3,764,297 A | * | 10/1973 | Coad | 75/10.23 |
| 3,771,984 A | | 11/1973 | Demarest | |
| 3,818,112 A | | 6/1974 | Clishem et al. | 373/40 |
| 3,893,836 A | | 7/1975 | Rough | 65/164 |
| 4,110,097 A | * | 8/1978 | Chevallier et al. | 65/134.3 |
| 4,328,019 A | * | 5/1982 | Dejaiffe et al. | 65/19 |
| 4,582,116 A | * | 4/1986 | Ray et al. | 164/463 |
| 4,584,007 A | | 4/1986 | Kurata | 65/337 |
| 4,594,089 A | | 6/1986 | Kurata | 65/135.8 |
| 4,600,426 A | * | 7/1986 | Schwenninger | 65/330 |
| 4,726,831 A | * | 2/1988 | Fogle et al. | 65/135.6 |
| 4,738,938 A | * | 4/1988 | Kunkle et al. | 501/72 |
| 4,780,121 A | | 10/1988 | Matesa | 62/134 |
| 4,929,266 A | | 5/1990 | Cozac et al. | 65/134.5 |
| 5,149,488 A | * | 9/1992 | Dickson | 266/242 |
| 5,268,925 A | * | 12/1993 | Binder et al. | 373/142 |
| 5,364,426 A | | 11/1994 | Richards | 65/474 |
| 5,367,532 A | | 11/1994 | Boen et al. | 373/156 |
| 5,647,833 A | * | 7/1997 | Wetmore et al. | 588/252 |
| 6,178,777 B1 | * | 1/2001 | Chenoweth | 65/136.2 |
| 6,185,243 B1 | * | 2/2001 | Boen et al. | 373/156 |
| 6,588,234 B1 | | 7/2003 | Kiefer et al. | 65/134.3 |
| 7,137,277 B1 | | 11/2006 | Romer et al. | 65/134.3 |
| 2005/0083989 A1 | | 4/2005 | Leister et al. | 373/27 |

FOREIGN PATENT DOCUMENTS

| | | | | |
|---|---|---|---|---|
| DE | 19710351 | | 5/1998 | C03B 5/04 |
| DE | 19939773 | | 2/2001 | C03B 5/02 |
| DE | 19939779 | | 2/2001 | C03B 5/02 |
| DE | 19939785 | | 2/2001 | C03B 5/183 |
| DE | 19939784 | | 5/2001 | C03B 5/225 |
| EP | 0528025 | | 2/1993 | C03B 5/00 |
| FR | 2 561 761 | | 9/1985 | |
| JP | 57-95834 | | 6/1982 | |
| JP | 63-274632 | | 11/1988 | C03B 5/225 |
| JP | 5-24851 | | 2/1993 | C03B 5/02 |
| WO | WO 98/05185 | * | 2/1998 | |
| WO | WO 01/14262 | | 3/2001 | H05B 6/30 |
| WO | WO 01/14265 | | 3/2001 | C03B 5/08 |

* cited by examiner

METHOD AND A DEVICE FOR THE REFINING OF GLASS

CROSS REFERENCE TO RELATED APPLICATIONS

This application is a continuation application of U.S. Patent No. 7,694,533, which issued on Apr. 13, 2010 and which is a national stage entry of International Application No. PCT/EP01/08148 filed on Jul. 14, 2001, which claims the benefit of German Application No. DE 100 41 757.4-45 filed on Aug. 25, 2000, the entire contents of all of which are incorporated by reference herein. This application is also related to U.S. Application Ser. No. 11/888,745, which is also a continuation of U.S. Pat. No. 7,694,533.

BACKGROUND OF THE INVENTION

1. Field of the Invention

The invention concerns the production of glass in general from waste glass or glass batches. The three essential stations of the production process comprise melting, then refining and finally homogenizing.

2. Description of Related Art

The production of high-value special glasses requires the process step of refining after melting, in order to remove the residual bubbles from the melt. The prior art comprises the refining of glasses by addition of refining agents such as redox refining agents or evaporating refining agents. One speaks here of chemical refining, since the release of gases form the melt is utilized in order to inflate small bubbles that are present and thus to facilitate the rise of these bubbles.

Along with the methods of chemical refining, alternatively or additionally, physical effects are utilized, as described in the literature, for expelling bubbles and thus for refining, such as, for example, centrifugal force (U.S. Pat. No. 3,893,836) or the reduction of the bath depth and thus the rise of bubbles to the surface of the melt is facilitated (DE 197 10 351 C1).

It is known that refining is promoted by increasing the temperature of the melt. However, when refractory material is used for the refining tank, limits are imposed. If ceramics with high a zirconium content are used, then temperatures of a maximum 16,500° C. can be produced.

It is known also to conduct refining in an apparatus that operates according to the so-called skull pot principle. See EP 0 528,025 B1. Such a device comprises a crucible, the walls of which are formed from a ring or collar of metal pipes, which can be connected to a cooling medium, with slots between the metal pipes adjacent to one another. The device also contains an induction coil, which surrounds the walls of the crucible and by means of which high-frequency energy can be coupled into the contents of the crucible. This direct heating of the glass melt by means of irradiation of high-frequency energy is conducted at a power of 10 kHz to 5 MHz.

Such a crucible permits essentially higher temperatures than a vessel made of refractory material. The advantage of high-temperature refining in comparison to all other physical refining processes is that it is very effective and rapid due to the high temperatures. The processes take place clearly more rapidly at high temperatures, so that very small, rapid aggregate modules can be prepared for the process of refining.

DE 2,033,074A describes an arrangement for the continuous melting and refining of glass. A refining device is provided therein, which operates according to the skull pot principle. The melt from the bottom region of the melting vessel reaches the refining vessel via a connection channel. It enters in the bottom region of the latter. The glass flow in the refining vessel thus rises upward from the bottom. This has the advantage that the flow has the same direction as the lifting force of the bubbles. The bubbles to be removed reach the hot surface of the melt and are discharged from the latter.

A disadvantage of this embodiment consists of the fact that the connection channel between the melting-down basin and the high-frequency refining device is subject to intense wear and tear due to the high flow velocities.

BRIEF SUMMARY OF THE INVENTION

The object of the invention is to develop a system in which the good refining results remain, based on an upward flow of the glass melt, but in which also the melt remains hot at the surface in the region where the bubbles are discharged, so that all bubbles can burst at the surface, and in which the problematic connection channel between the melting vat and the refining device can be omitted.

The inventor has recognized the following: If the inlet as well as the outlet of the high-frequency crucible is arranged in the upper region and in fact in such a way that the two of these lie opposite one another, then a very good and effective refining results. One would have expected that with such a structure, an essential part of the melt would be unheated and unrefined and led along directly to the outlet in the short circuit from the inlet at the surface. However, this is not the case. Rather, a defined flow is set up based on the differences in density in different melt regions. If the expansion coefficient of the melt is sufficiently high and the heating of the melt in the crucible is assured appropriately, the laterally introduced cold glass does not directly reach the crucible outlet via short-circuit currents, but is first pulled to the bottom of the crucible and from here is led to the surface and to the outlet via convection rollers according to circular movements of variable length.

The inlet and outlet should essentially lie diametrically opposite each other. This is not absolutely necessary, however; certain deviations are admissible. Also, the crucible should be dimensioned correctly, but this is an optimizing problem, which can be solved by the person of average skill in the art.

The connection channel between the melting vat and the refining crucible, which is known from the prior art, will be avoided. Instead of this, the melt can overflow from the melting vat into an open channel to the refining crucible.

It may be appropriate to configure the refining crucible according to DE 2,033,074 A. The crucible comprises a lower part of relatively small diameter, and an upper part of relatively large diameter.

BRIEF DESCRIPTION OF THE SEVERAL VIEWS OF THE DRAWINGS

The invention is explained in more detail on the basis of the drawing. The following are shown individually therein.

DETAILED DESCRIPTION OF THE INVENTION

Figure 1:
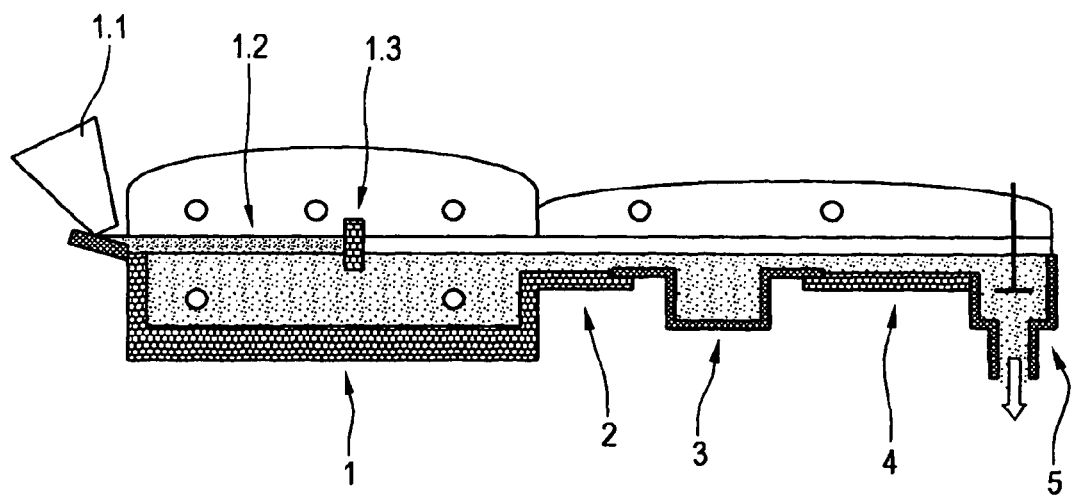
FIG. 1 shows a set-up for the production of glass.

The set-up shown in FIG. 1 comprises a melting-down basin 1 with an introduction device 1.1. The glass batch 1.2 which has been introduced is retained by a bridge barrier 1.3 to keep it from flowing further to the stations connected downstream.

An overflow channel 2 is connected to the melting-down basin 1. This is open at the top. The crude melt reaches a refining device 3 via the overflow channel 2.

This refining device comprises a skull crucible and also a high-frequency coil, which is not shown here. The actual refining is conducted here at temperatures of 1750 to 3,000° C., depending on the glass synthesized and the requirements for glass quality.

After the refining, the melt is free of bubbles. It reaches a homogenizing device 5, which in turn comprises a stirring crucible and a stirrer, via a conventionally heated channel system 4.

Figure 2:
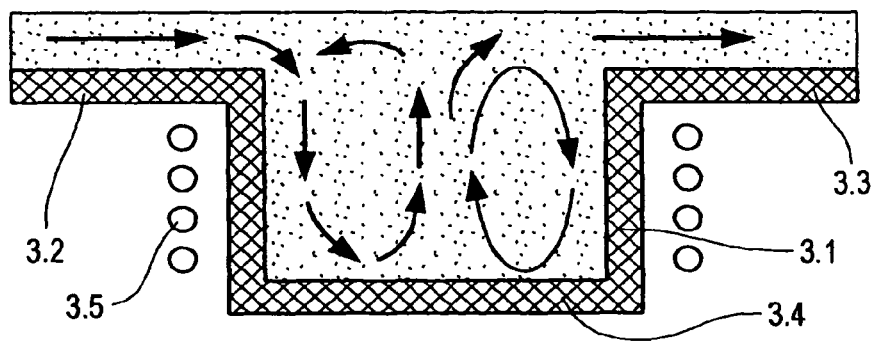
FIG. 2 shows a refining crucible according to the invention in a vertical section.

The structure of the skull crucible can be recognized in detail in FIG. 2. This involves a so-called mushroom skull crucible according to DE 2,033,074 A. The skull crucible has a lower crucible part 3.1 of a relatively small diameter, and in addition an upper crucible part of a relatively large diameter. The upper crucible part also contains the inlet 3.2 and the outlet 3.3 for the melt. The arrows indicate the flow of the melt. As is seen, the cold glass introduced laterally through the inlet 3.2 first falls downward to the bottom of the crucible 3.4, then rises again upward in order to once more flow downward and then upward again. As is seen, the lower part 3.1 of the skull crucible is surrounded by a high-frequency coil 3.5.

Figure 3:
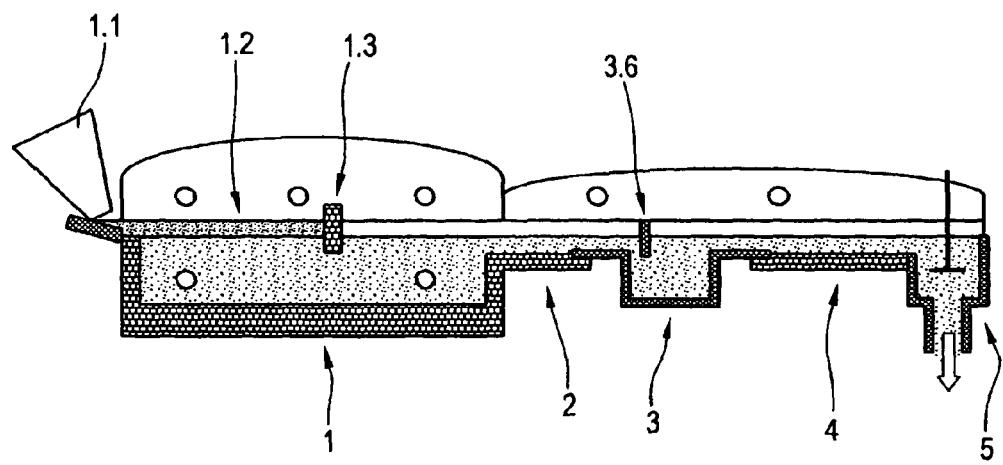
FIG. 3 shows another embodiment of a set-up for the production of glass.

The set-up shown in FIG. 3 is the refining device 3 equipped with an additional, cooled bridge barrier 3.6. This has the following task: If the glass arriving in the skull refining aggregate is very foamy or the expansion coefficient of the melt as a function of temperature is very small, then the danger exists that a small portion of the melt is drawn over the surface. This can be prevented either by a clear increase in the temperature difference between the melt flowing in and the melt in the core of the crucible in the skull crucible module or by incorporating the bridge barrier 3.6.

The bridge barrier 3.6 may be comprised of either a gas-cooled or liquid-cooled ceramic material or of a water-cooled metal material. Modifications of cooled metal components lined with ceramics are also conceivable. If the bridge barrier has metal components, which lie above the surface of the melt and come into contact with the burner atmosphere, then it may be helpful to coat the bridge barrier with a thin layer of Teflon (<150μ) in order to prevent a corrosion of the metal surface due to the aggressive burner atmosphere. The bridge barrier 3.6 can either be positioned centrally in the refining module or can be laterally displaced to inlet 3.2. The latter modification has the advantage that the hot zone where the bubbles rise can be made as large as possible. If the bridge barrier is constructed of metal material, then it should be electrically connected to the metal skull crucible, so that no induced voltages build up between the metal corset and the barrier, since these can lead to arcing and thus to the disruption of the metal wall. If an electrical connection cannot be produced, then all components must be operated in an electrically free-floating manner—i.e., not grounded. This is particularly possible if the melt tends toward intense crystallization, since In this case a stable puncture-proof intermediate layer is formed, which reliably stops the arcing.

Figure 4:
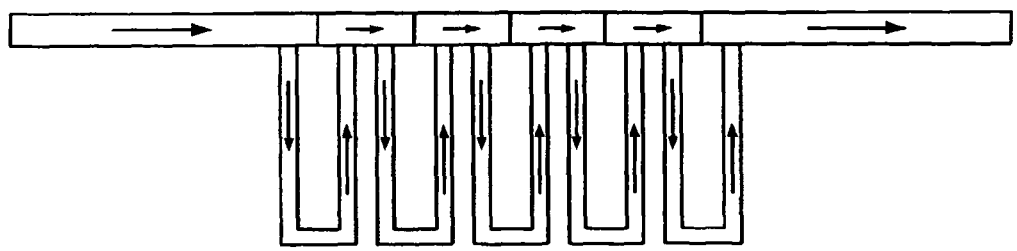
FIG. 4 shows a cooled bridge barrier in the skull crucible, in schematic representation.

An example of embodiment of such a bridge barrier 3.6 is shown in FIG. 4. The incorporation of such a barrier 3.6 can be seen in FIG. 5. Here, the barrier 3.6 is positioned below the surface of the melt. This has the advantage that there are no cold metal components in the upper furnace space. The condensation of burner off-gases is particularly problematical on cold components. It is a disadvantage in this type of assembly that large fluctuations in the glass level cannot be allowed, since in order to assure that no liquid melt flows over the barrier, the immersion depth should be a maximum of 1 cm below the surface of the melt.

A barrier assembly can be made possible with the edge of the barrier above the upper edge of the glass bath by lining the metal barrier either with Teflon or ceramic materials or by raising the glass level first higher at the beginning of the process—and in fact raising it over the upper edge of the barrier—and then again lowering the glass level to the normal level in operation. In this case, a glazing of the barrier is achieved, which protects the barrier from attacks due to burner off-gases. In addition to the embodiment of the barrier that is shown here, simpler embodiments, for example, a simple ceramic stone barrier or even a cooled metal rod which runs crosswise over the crucible is conceivable.

Figure 5:
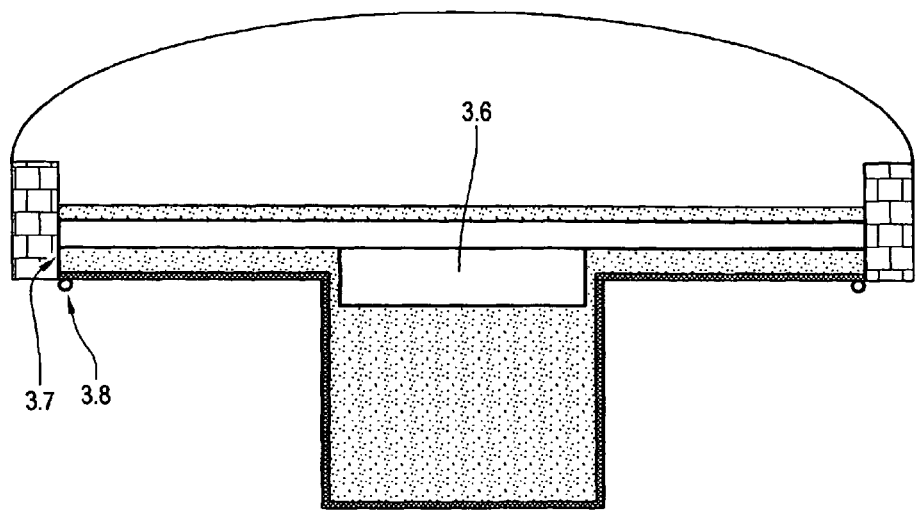
FIG. 5 illustrates the integration of the bridge barrier into a skull crucible.

An electrical connection 3.7 of the crucible 3 with the barrier 3.6 as well as a crucible short-circuit ring 3.8 can be seen in detail in FIG. 5.

Figure 6:
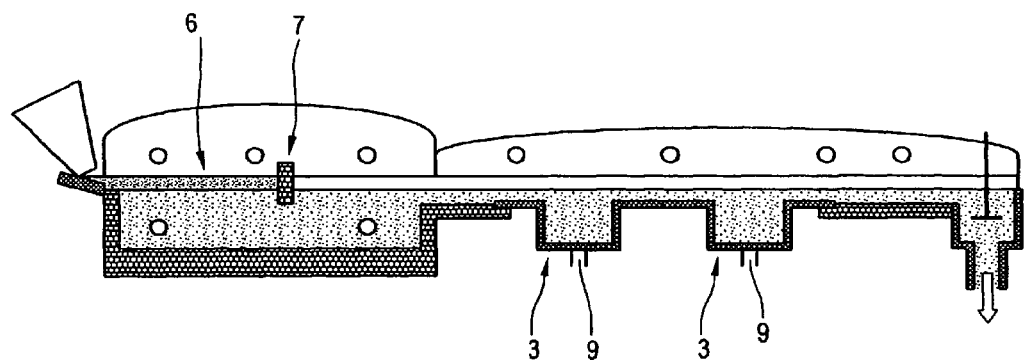
FIG. 6 shows a set-up for the melting of glass with two refining stations.

A cascade refining is provided In the set-up shown in FIG. 6. The introduced glass batch 6 as well as a bridge barrier 7 can also be recognized again here.

Several refining modules are connected one after the other and they connect with one another simply in the upper region. The connection sites can be heated conventionally, for example, with burners. In this case, complicated connection channels that are sensitive to disruption and consume a great deal of energy can be omitted. An example with two refining modules connected one after the other is shown in FIG. 6. Of course, any number of refining modules connected one after the other is conceivable.

With respect to geometry—particularly diameter—, HF-frequency and HF voltage are adapted to the conductivity of the glass to be melted in each case. If different types of glass with clearly different electrical conductivities are to be melted in the same vat and are to be refined by means of HF heating, then this is not possible without retrofitting measures (connection of another generator with adapted frequency region, connection of an adapted coil, possible change of the melting diameter, adaptation of the capacities in the HF generator). Of course, as in FIG. 6, two or more aggregates can be connected one after the other, and thus each individual module can be adapted to different electrical melting properties. The HF energy is only turned on in the HF refining module adapted to the respective melt, whereas the other modules are not heated with HF energy, but only with conventional energy—such as, for example, burners in the upper furnace space. The melt flows over the modules that are not turned on and is drawn into and heated only in the HF-heated module. In order to configure the exchange of glass in such an aggregate in a simpler and quicker manner, it is helpful if each module has an additional bottom outlet 9, which is opened for a short time in the glass exchange phase. Such a bottom outlet can also be of use in the case of the simple structure with only one HF-module—particularly if exchanges of glass in the vat are considered—but also if bottom residues should deposit thereon.

Another advantage of the invention is the very good "emergency running properties" of the set-up if there are disruptions in the HF range. If the high-frequency heating apparatus fails for any reason whatever, then there exists the danger of a freezing up of the continuous flow in the case of the continuous-flow crucible with introduction from below, whereby the glass flow is interrupted. The danger does not exist in principle in the present invention, since the glass flow can be assured in each case by utilizing the upper heat of the burner.

What is claimed is:

1. A method for the refining of a glass melt, which is heated by irradiation of high-frequency energy, by high temperatures in a core of a skull crucible, the method comprising:
    introducing the glass melt through an inlet in an upper region of the skull crucible;
    coupling the high-frequency energy into the glass melt in the skull crucible via a high frequency coil to heat the glass melt to a temperature of between 1,750 to 3,000° C.;
    refining the glass melt in the skull crucible at a temperature between 1,750 to 3,000° C.;
    discharging the glass melt through an outlet in the upper region of the skull crucible, the outlet being at a place essentially lying opposite the inlet; and
    preventing a short-circuit flow of the glass melt between the inlet and the outlet by increasing, via the high frequency coil, a temperature difference between the glass melt flowing into the skull crucible through the inlet and the glass melt in the core of the skull crucible.

2. A method for the refining of a glass melt, which is heated by irradiation of high-frequency energy, by high temperatures in a core of a skull crucible, the method comprising:
    introducing the glass melt through an inlet in an upper region of the skull crucible;
    coupling the high-frequency energy into the glass melt in the skull crucible to heat the glass melt to a temperature of between 1,750 to 3,000° C.;
    refining the glass melt in the skull crucible at a temperature between 1,750 to 3,000° C.;
    discharging the glass melt through an outlet in the upper region of the skull crucible, the outlet being at a place essentially lying opposite the inlet; and
    preventing a short-circuit flow of the glass melt between the inlet and the outlet by increasing a temperature difference between the glass melt flowing into the skull crucible through the inlet and the glass melt in the core of the skull crucible by coupling the high-frequency energy into the glass melt in the core of the skull crucible.

3. A method for the refining of a glass melt, which is heated by irradiation of high-frequency energy, by high temperatures in a core of a skull crucible, the method comprising:
    introducing a crude glass melt through an inlet in an upper region of the skull crucible, the skull crucible having an outlet in the upper region lying essentially opposite the inlet;
    preventing a short-circuit flow of the crude glass melt from the inlet to the outlet by increasing a temperature difference between the crude glass melt flowing into the upper region and the glass melt in the core of the skull crucible, wherein the preventing step comprises coupling the high-frequency energy into the skull crucible to refine the crude glass melt into a refined glass melt at a temperature between 1,750 to 3,000° C.; and
    discharging the refined glass melt through the outlet.

* * * * *